United States Patent [19]

Foster et al.

[11] Patent Number: 5,404,442
[45] Date of Patent: Apr. 4, 1995

[54] VISIBLE CLIPBOARD FOR GRAPHICAL COMPUTER ENVIRONMENTS

[75] Inventors: Gregg S. Foster, Woodside; Stephen P. Capps, San Carlos; Benjamin W. Sharpe, San Francisco, all of Calif.

[73] Assignee: Apple Computer, Inc., Cupertino, Calif.

[21] Appl. No.: 983,376

[22] Filed: Nov. 30, 1992

[51] Int. Cl.$^6$ ............................................. G06F 15/62
[52] U.S. Cl. ................... 395/159; 395/146; 364/419.17
[58] Field of Search ............ 395/155, 157, 159, 151, 395/139, 133, 134, 135; 340/724, 730; 345/119, 121; 364/419.17

[56] References Cited

U.S. PATENT DOCUMENTS

| | | | |
|---|---|---|---|
| 4,899,136 | 2/1990 | Beard et al. | 395/157 |
| 5,051,927 | 9/1991 | Tada et al. | 395/139 |
| 5,146,556 | 9/1992 | Hullot et al. | 395/159 |
| 5,148,155 | 9/1992 | Martin et al. | 340/712 |
| 5,157,763 | 10/1992 | Peters et al. | 395/157 |
| 5,196,838 | 3/1993 | Meier et al. | 340/724 |
| 5,251,291 | 10/1993 | Malcolm | 395/146 |
| 5,301,268 | 4/1994 | Takeda | 395/157 |
| 5,305,435 | 4/1994 | Bronson | 395/157 |

FOREIGN PATENT DOCUMENTS

457990 11/1991 European Pat. Off. .

OTHER PUBLICATIONS

"Microsoft Windows User's Guide for the Windows Graphical Environment Version 3.0", Microsoft Corp. (1990), pp. 15-75 and 259-313.
Biedny, D., "Digitizing Tablets", MacWeek, vol. 2 No. 43 (Oct. 25, 1988) pp. 22-21.
"Microsoft Windows User's Guide Version 3.0", Microsoft, Corp. (1990), pp. 79-96.
Duncan, "Adding a Pen to Windows" A Look at the Pen Windows API, PC Magazine vol 11, No. 2 pp. 335-339.
"Microsoft Ships New Windows", San Jose Mercury News (Mar. 18, 1992), p. E1.

*Primary Examiner*—Heather R. Herndon
*Assistant Examiner*—N. Kenneth Burraston
*Attorney, Agent, or Firm*—Hickman & Beyer

[57] ABSTRACT

Text, graphics, or other selected objects of a computer screen are selected and converted into a "visual clipboard" which is attached to a convenient boundary of the screen. The visible clipboard is preferably implemented on a pen-based computer system where the object is selected by a stylus, is dragged to a boundary, and is converted to a clipboard icon at the boundary. Multiple clipboard icons may be produced by the user, and can be moved from one boundary location to another. The contents of the clipboard can be inserted or "pasted" into an application program by dragging the clipboard icon with the stylus to the desired insertion location. Preferably, each clipboard is provided with indicia representative of the contents of the clipboard.

26 Claims, 20 Drawing Sheets

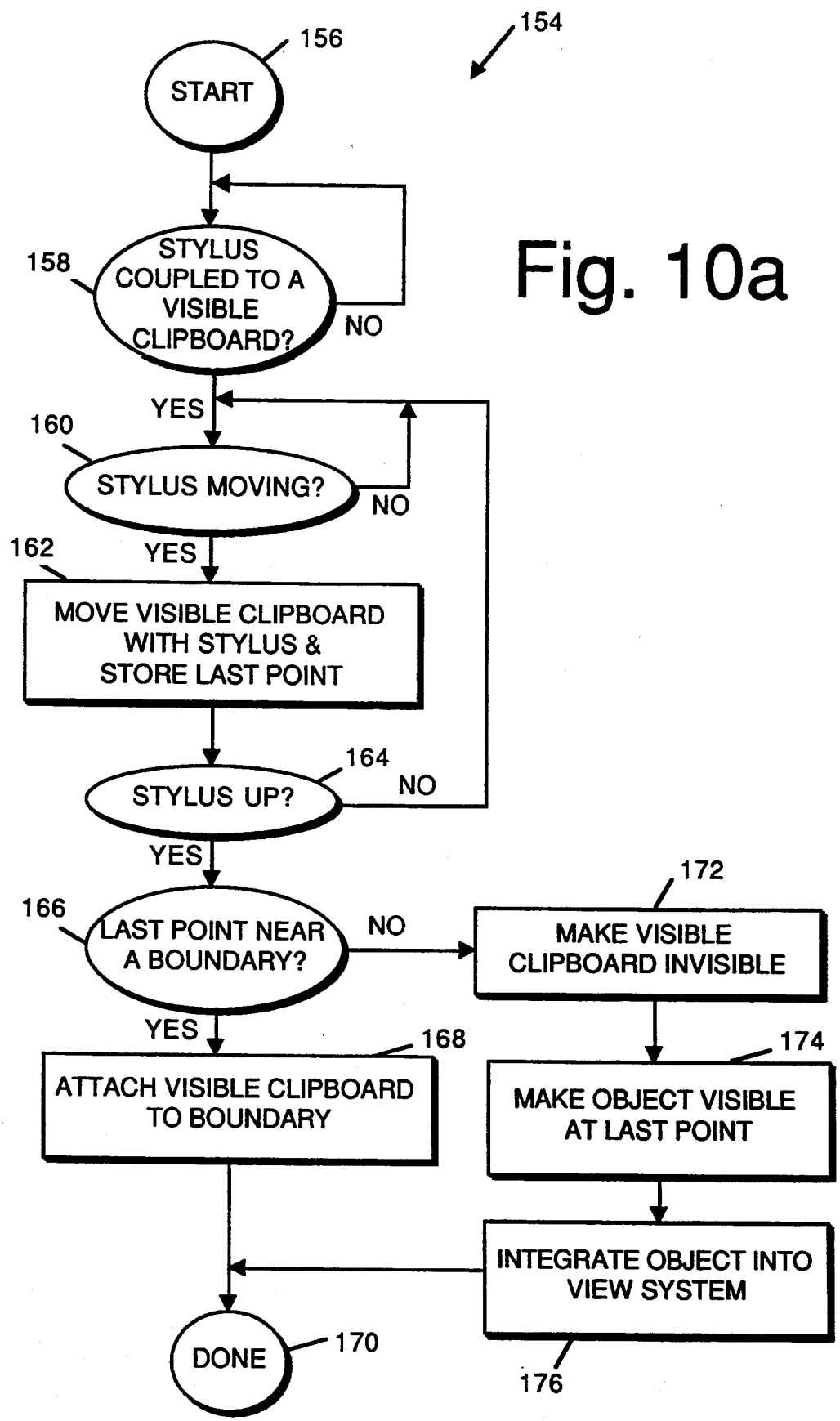

VISIBLE CLIPBOARD FOR GRAPHICAL COMPUTER ENVIRONMENTS

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based computer system. A pen-based computer system is typically a small, hand-held computer where the primary method for inputting data includes a "pen" or stylus. A pen-based computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen-based computers can provide a number of useful functions, such as serving as an address book, an appointment calendar, a to-do list, etc.

It is often desirable to be able to move or copy objects (i.e. associated images) on a computer screen. These objects can be moved within a single application program (e.g. a notepad application program) or between two different application programs (e.g. between a notepad application program and a calendar application program). The term "object" as used herein means any selected text, graphic, or other image on the computer screen which is to be moved or copied as a unit.

In the prior art, a move or copy is often accomplished with a conceptual device known as a "clipboard." For example, to copy an object, the object is first selected on a computer screen by means of some type of pointing device such as a mouse, trackball, etc., and the selected object is then copied into an area of memory used by the clipboard. The pointing device is then used to indicate where the content of the clipboard is to be inserted, and then the content of the clipboard is "pasted" into the application program at the indicated location. A move is accomplished in substantially the same manner as a copy, except the selected object removed from the original place on the screen. These processes are sometimes referred to as "copy-and-paste" and "cut-and-paste", respectively.

A problem with prior art clipboards is that they are invisible to the user. Users can therefore forget that they have something stored in the clipboard, or they may forget what is in the clipboard. This can result in a variety of errors. For example, if a user is interrupted during a move process and forgets to paste the object back into an application program. The contents of the clipboard may be permanently lost. Also, if the user forgets what the content of the clipboard is, they may inadvertently paste incorrect objects into an application program. Furthermore, since the clipboard is invisible, it is difficult to provide multiple clipboards storing a variety of objects.

SUMMARY OF THE INVENTION

The present invention provides one or more visible clipboards which can be used in a cut-and-paste (move) and copy-and-paste (copy) operations. Preferably, the clipboards include indicia representative of the content of the clipboard. Since the clipboards are visible, a user is constantly reminded of the presence of the stored objects. Furthermore, a visual clipboard facilitates the use of multiple clipboards, thereby greatly increasing the effectiveness of the clipboard function.

A visible clipboard in accordance with the present invention is preferably implemented on a pen-based computer system including a touch sensitive screen and a stylus. The stylus is used to select an image displayed on a screen, and the image is dragged by the stylus across the screen until a boundary of the screen is impinged. The boundary of the screen can be one of the edges of the screen, or it can be any boundary created within the screen itself, e.g. an edge of a window, palette, status bar, anchor point, etc. Once the boundary has been impinged, the selected image is removed from the screen and a small icon representing a clipboard is displayed at or near the impinged boundary. Preferably, the icon includes indicia indicating the contents of the clipboard.

A method for creating a visual clipboard in accordance with the present invention includes the steps of selecting an object on a computer screen, dragging the object with a pointing device, and replacing the object with an icon when a boundary on the computer screen is impinged. The step of replacing the object with the icon preferably occurs when the pointing device (e.g. stylus) contacts or is within a predetermined distance of the boundary. Alternatively, a step of replacing the object can occur when the object contacts or is within a predetermined distance of the boundary.

A method for moving the visual clipboard includes the steps of selecting a visual clipboard icon on a computer screen, dragging the icon on the screen with a pointing device, and depositing the icon when a boundary on the computer screen is impinged. The icon can be deposited when the pointing device is at or near the boundary, or when the icon itself is at or near the boundary. The process permits a visual clipboard to be moved around a computer screen for organizational purposes.

Finally, a method for moving an object in accordance with the present invention includes the steps of selecting an object at a first location on a computer screen, converting the object to an icon by dragging the object to a second location on the screen, dragging the icon to a third location on the screen, and converting the icon back to the object at the third location. Again, the process is preferably implemented on a pen-based computer system where the steps of selecting an object and dragging an object are accomplished with a stylus.

While the preferred embodiments of the present invention comprise a cut-and-paste (move) operation, a copy-and-paste (copy) operation can be implemented by retaining an image of the dragged object at its original position.

The visible clipboard of the present invention has several distinct advantages over the invisible clipboards of the prior art. For one, a user is constantly reminded of the presence of a clipboard and is provided with visual feedback of its contents. Another important advantage is that multiple clipboards can be used and manipulated. Finally, the visible clipboard provides a friendlier and more intuitive method for moving or copying objects in a graphical user interface environment.

These and other advantages of the present invention will become apparent upon a reading of the following descriptions and a study of the various figures of the drawing.

BRIEF DESCRIPTION OF THE DRAWINGS

FIG. 4b illustrates the continued dragging of the graphical object of FIG. 4a;

FIG. 10a is a flow diagram illustrating the process steps for moving the visual clipboard and for pasting the contents of the visual clipboard into an application program.

DETAILED DESCRIPTION OF THE PREFERRED EMBODIMENTS

The present invention is well suited for pointer based computer systems such as the pen-based, stylus-based and mouse-based systems that are currently popular. For the purposes of illustration, the invention will be described in connection with a pen-based system.

Figure 1:
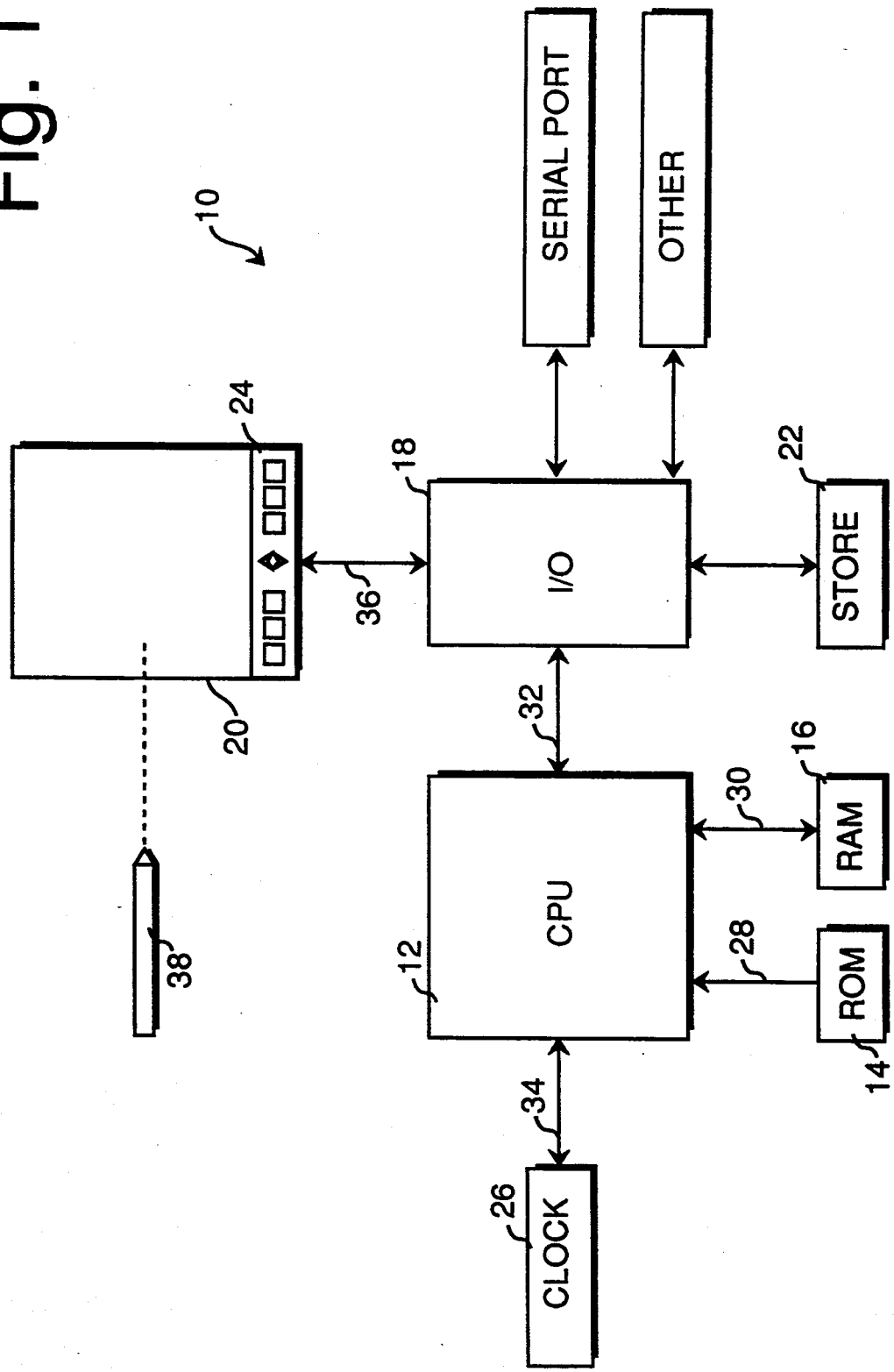
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input-/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 provides a series of clock pulses and is typically coupled to an interrupt port of CPU 12 by a data line 34. The clock pulses are used to time various functions and events relating to the computer system 10. The clock 26 can be eliminated and the clock function replace by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, nonvolatile memory such as flash memory, battery backed RAM, PC-data cards, or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
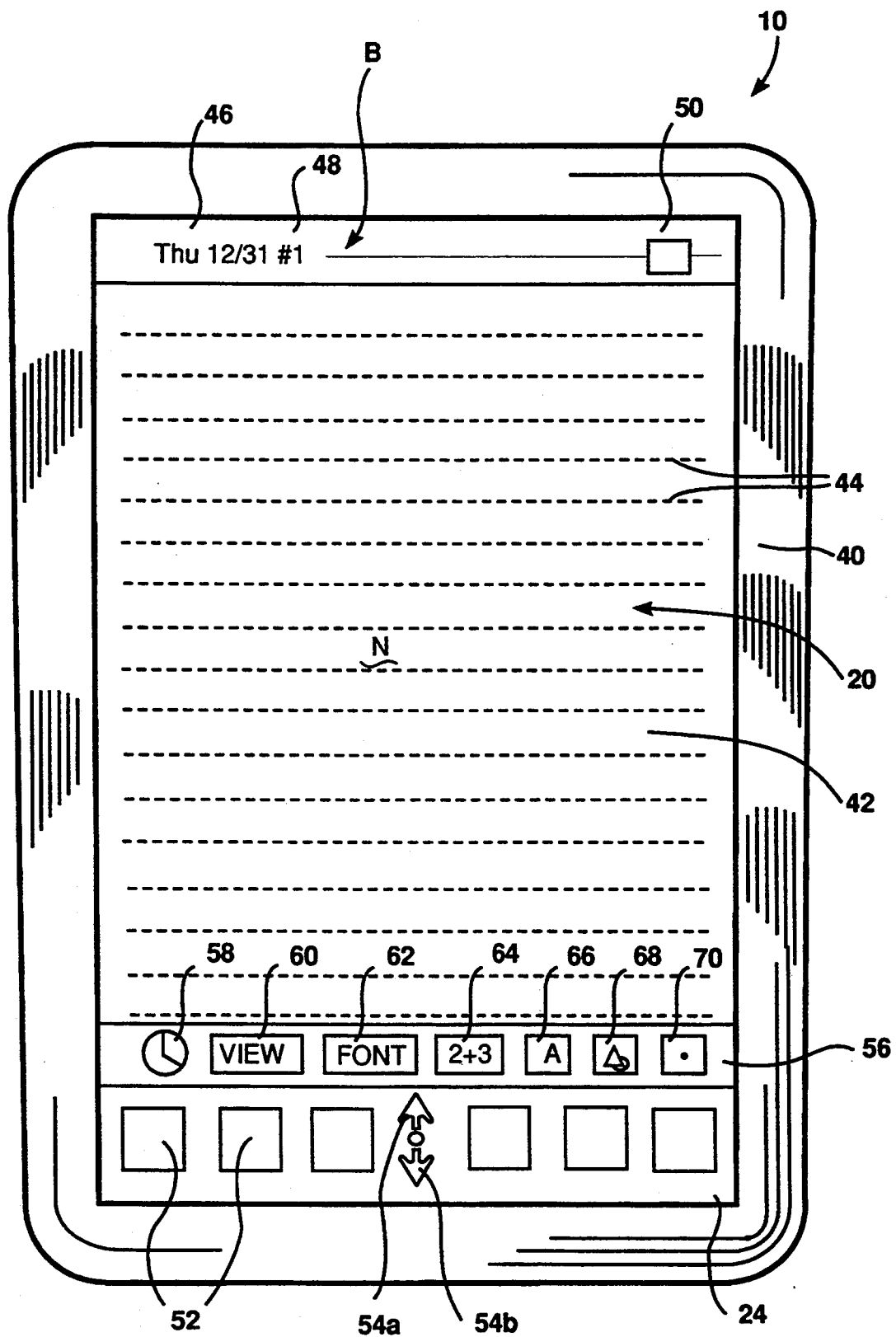
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a breaker bar B and a number of guidelines 44. The breaker bar B preferably includes the day and date of creation 46 of the note N, a note number 48, and a "router" button 50 which allows notes to be dispatched to a printer, facsimile, the trash, etc. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application Ser. No. 07/868,013, filed Apr. 13, 1992 on behalf of Tchao et al. and entitled "Method for Manipulating Notes on a Computer Display" still pending. That application is assigned to the assignee of the present application and its disclosure is hereby incorporated by reference in its entirety.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, a formulas button 64, a text button 66, a graphics button 68, and a nib button 70. Co-pending patent application Ser. No. 07/976,970, filed Nov. 16, 1992 on behalf of Foster et al., entitled "Status Bar for Application Windows" still pending and assigned to the assignee of the present invention describes the operation of the status bar, and is hereby incorporated herein by reference in its entirety.

Figure 3:
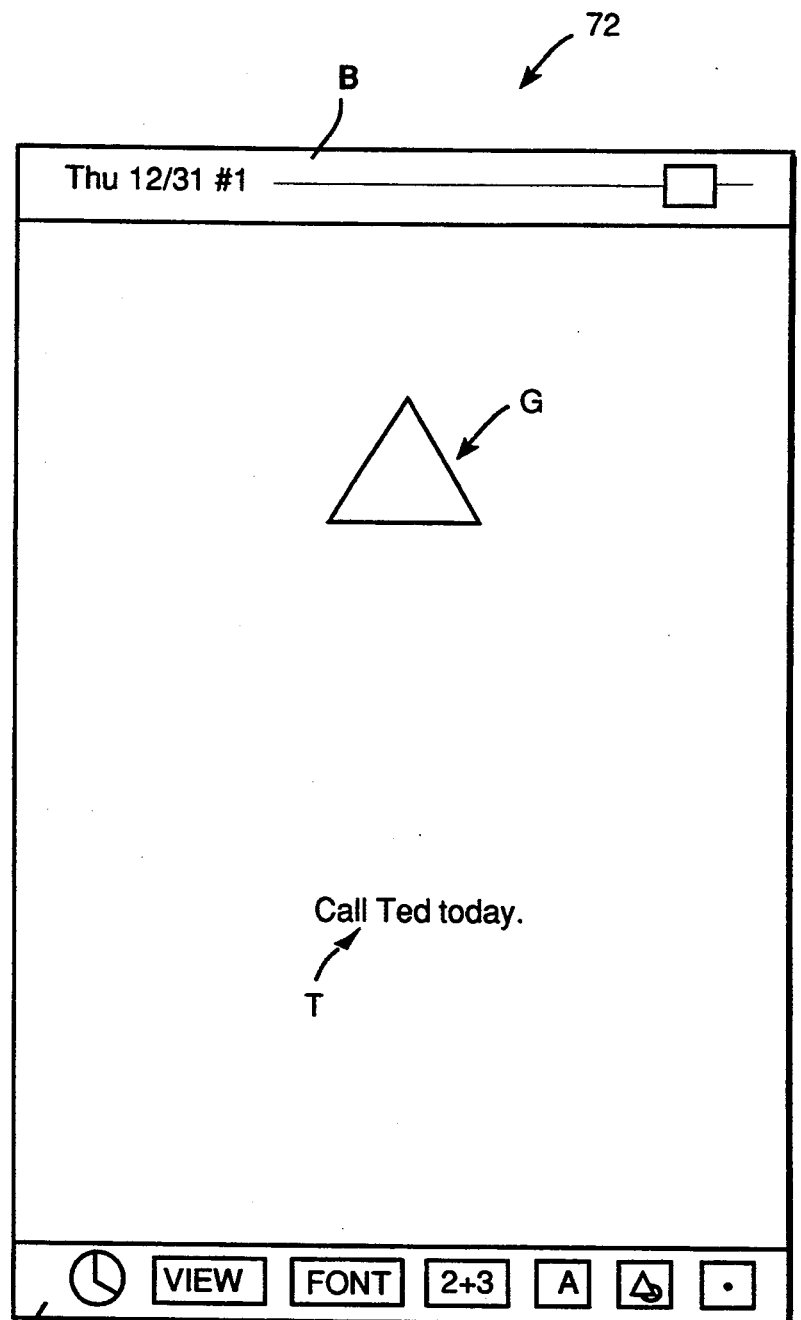
FIG. 3 is a view of the screen displaying a graphical object and a text object.

FIG. 3 illustrates a screen 72 provided with the header bar B, status bar 56, a graphical object G and a text object T. In this instance, the graphical object G is an equilateral triangle, and the text object T is the sentence "Call Ted today." The graphical object G and the text object T are preferably provided on the screen 72 by means of the stylus 38, although they could also be entered through other means such as the serial port. The graphical object G and text object T can be stored internally to the computer system 10 in either recognized or unrecognized (i.e. as ink) form.

Figure 4A:
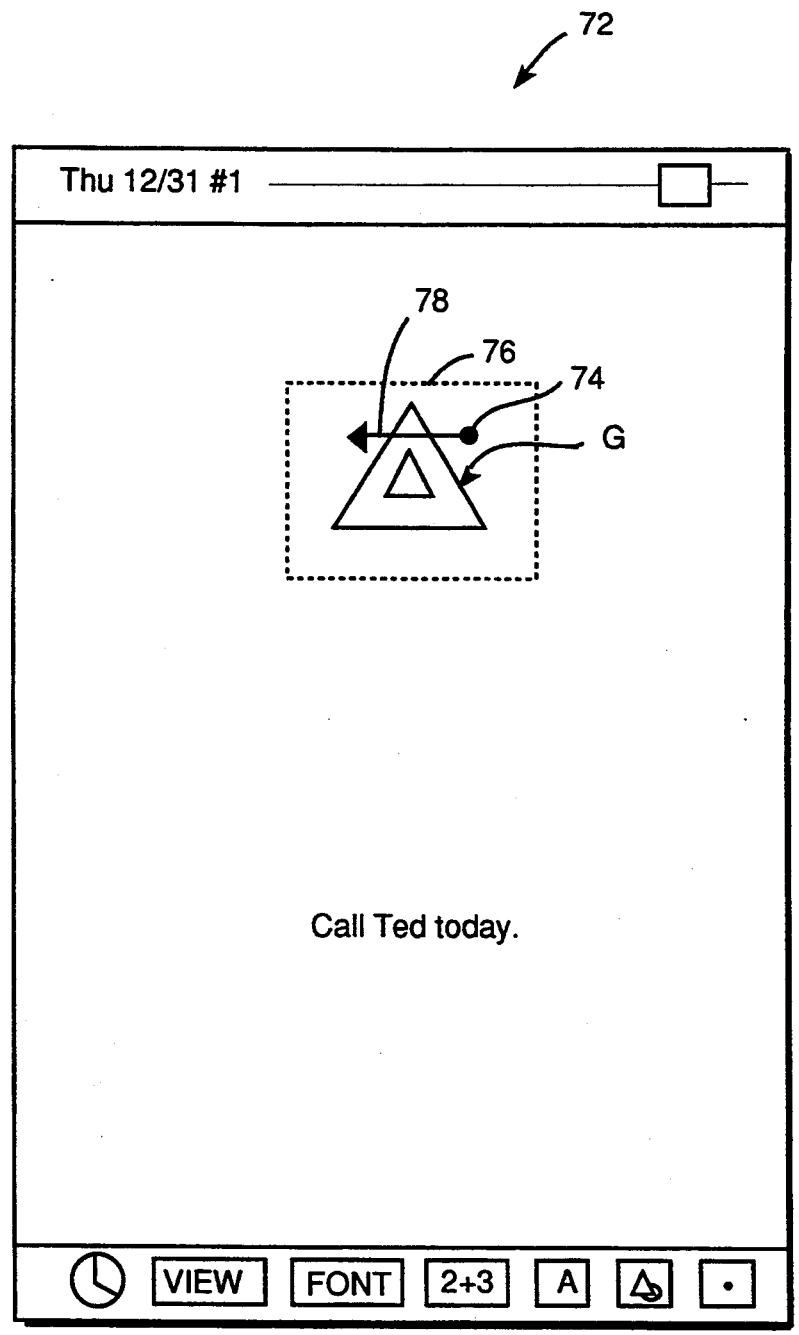
FIG. 4a illustrates the selection and dragging of the graphical object of FIG. 3.

In FIG. 4a, the graphical object G has been selected by placing the tip of the stylus 38 at a point 74 within a "bounding box" 76 of the graphical object G. As will be discussed in greater detail subsequently, the graphical object G is stored with a "frame system" which provides information concerning the object G, including the coordinates of its bounding box 76. Essentially, the bounding box 76 is the minimum size box which fully encloses an object with a little buffer space. In other words, the lower left corner of the bounding box is substantially defined by the minimum x coordinate ($x_{min}$) and the minimum y coordinate ($y_{min}$) for an object, and the upper right-hand corner of the bounding box 76 is substantially defined by the maximum x coordinate ($x_{max}$) and the maximum y coordinate ($y_{max}$) of the object. It is therefore a relatively straightforward task to determine whether the point 74 of the stylus 38 is within the bounding box 76 by determining whether its x coordinate lies between $x_{min}$ and $x_{max}$ and whether its y coordinate lies between $y_{min}$ and $y_{max}$.

Once the graphical object G has been selected, it is preferably to provide some form of user feedback. In this instance, the graphical object G has been "ballooned" into an exaggerated version of itself, and a visible bounding box 76 has been provided. Other forms of selection feedback can also be provided, such as showing the graphical object G in reverse video.

With the stylus tip still on the screen 76, the graphical object G is dragged as indicated by the arrow 78. Techniques for dragging objects are well known to those skilled in the art. For example, it is a simple process to detect a $\Delta x$ position and a $\Delta y$ position of the tip of stylus 38 within a period of time $\Delta t$. Each point on the object is then also translated by the coordinates $\Delta x$ & $\Delta y$. If the period of time $\Delta t$ is sufficiently small, e.g. 1/10th of a second, the stylus 38 appears to be physically "dragging" the object across the screen.

Figure 4B:
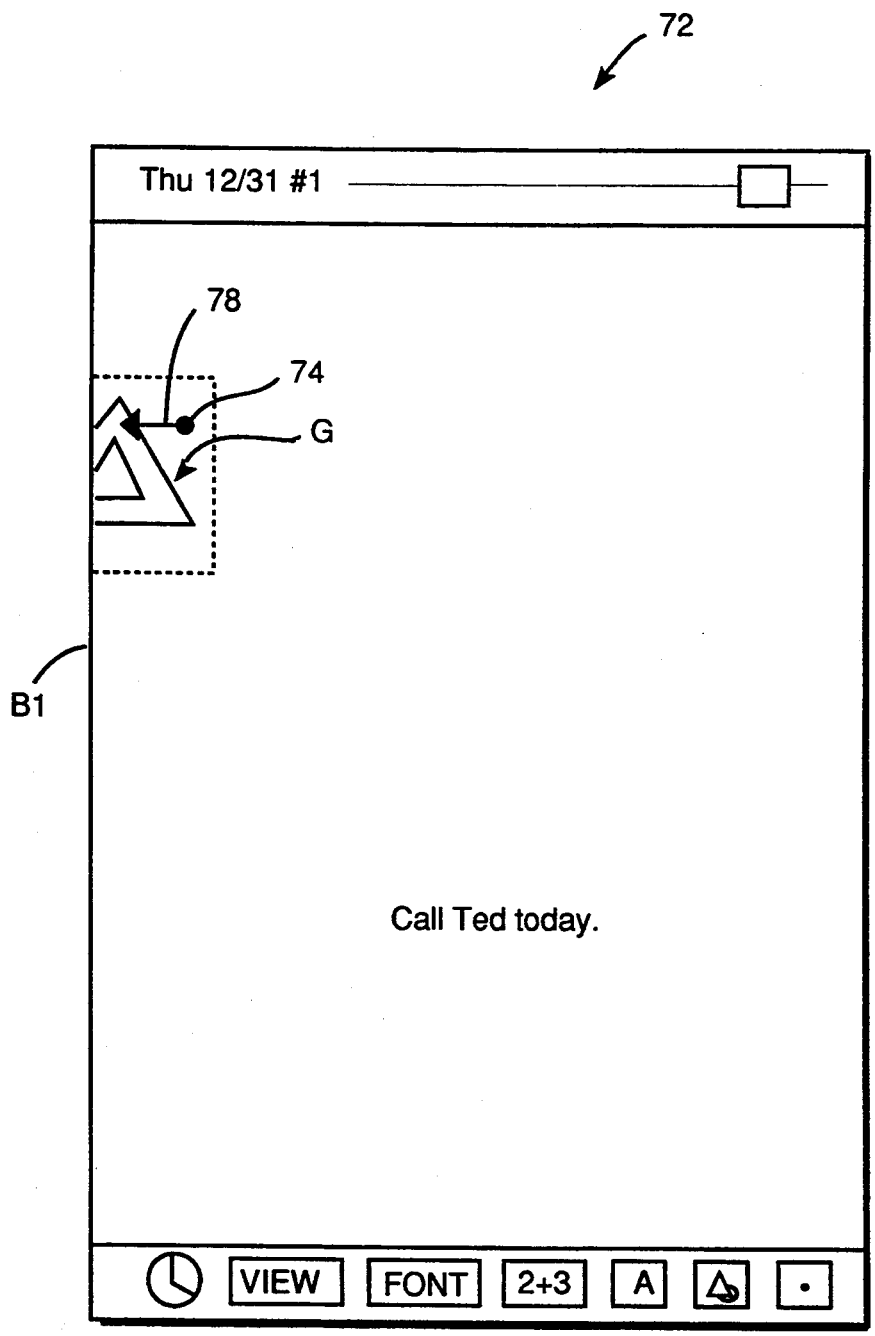

In FIG. 4b, the graphical object G has been dragged to a boundary B1 of the screen 72. In this instance, the boundary B1 is the left-hand edge of the screen 72. As will be discussed in more detail subsequently, any of the four edges of the screen 72 may be used as a boundary, or artificial boundary lines, anchor points, or other perimeters can be provided within the viewing area of the screen 72. It should be noted that as the graphical object G is dragged towards the boundary B1, portions of the graphical object G area are obscured by the edge of the screen. This phenomenon can be likened to imagining the screen 72 as a "window" on a larger surface which includes the graphical object G. Portions of the graphical object G that are not within the "window" of screen 72 can be conceptualized as existing on this larger surface but obscured by the edge of the window.

Figure 4C:
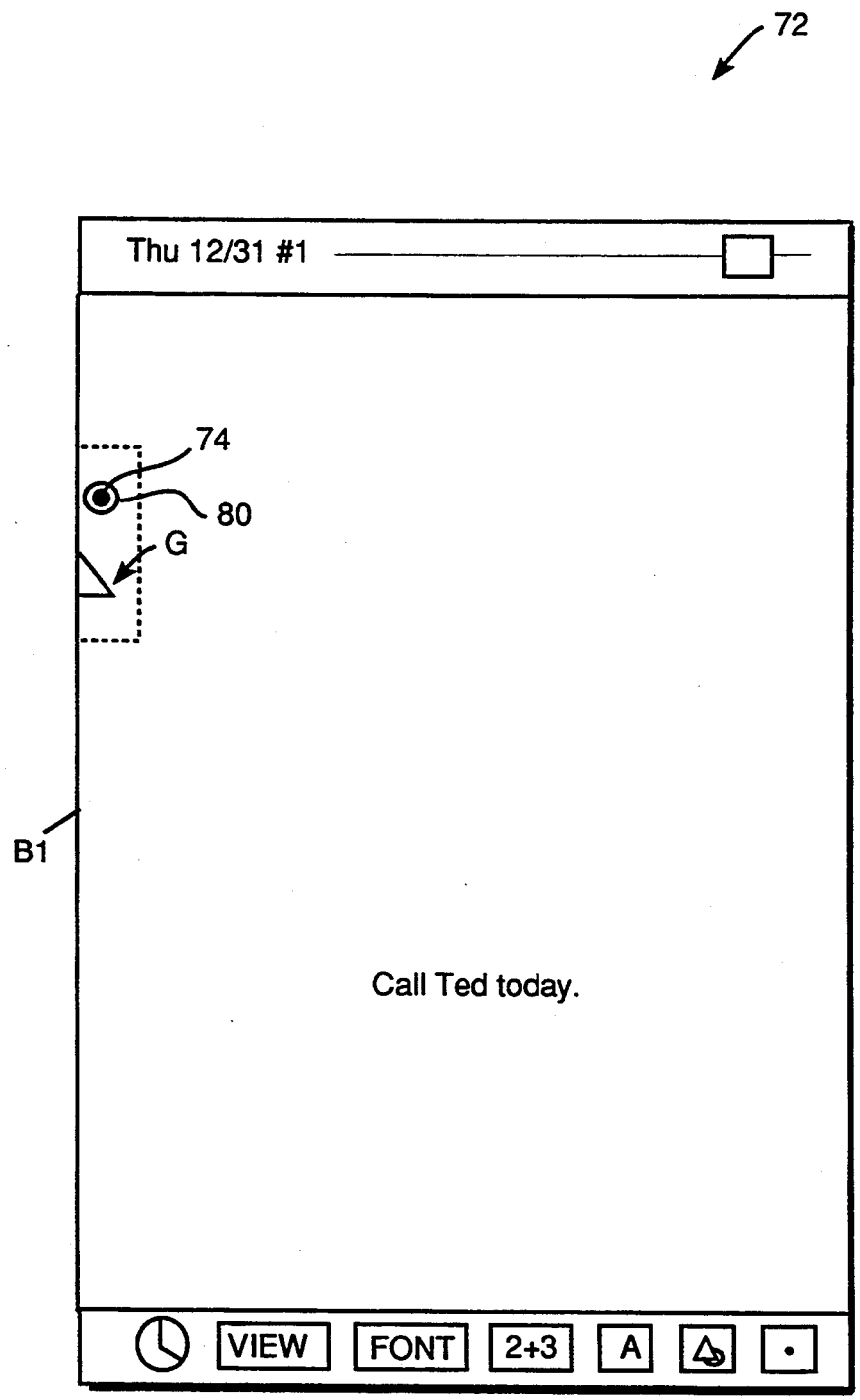
FIG. 4c illustrates the impingement of the stylus point on a boundary of the computer screen.

In FIG. 4c the graphical object G has been dragged toward boundary B1 until the point 74 of the stylus 38 is at or near (e.g. within a few pixels of) the boundary B1. At this point, the stylus 38 is lifted from the screen as indicated by the circle 80 or, in the alternative, simply moves off of the screen past boundary B1. In this preferred embodiment, this "impingement" of the point 74 of the stylus 38 with the boundary B1 indicates to the computer system 10 that the object G is to be converted into a visible clipboard attached to the boundary B1.

Figure 4D:
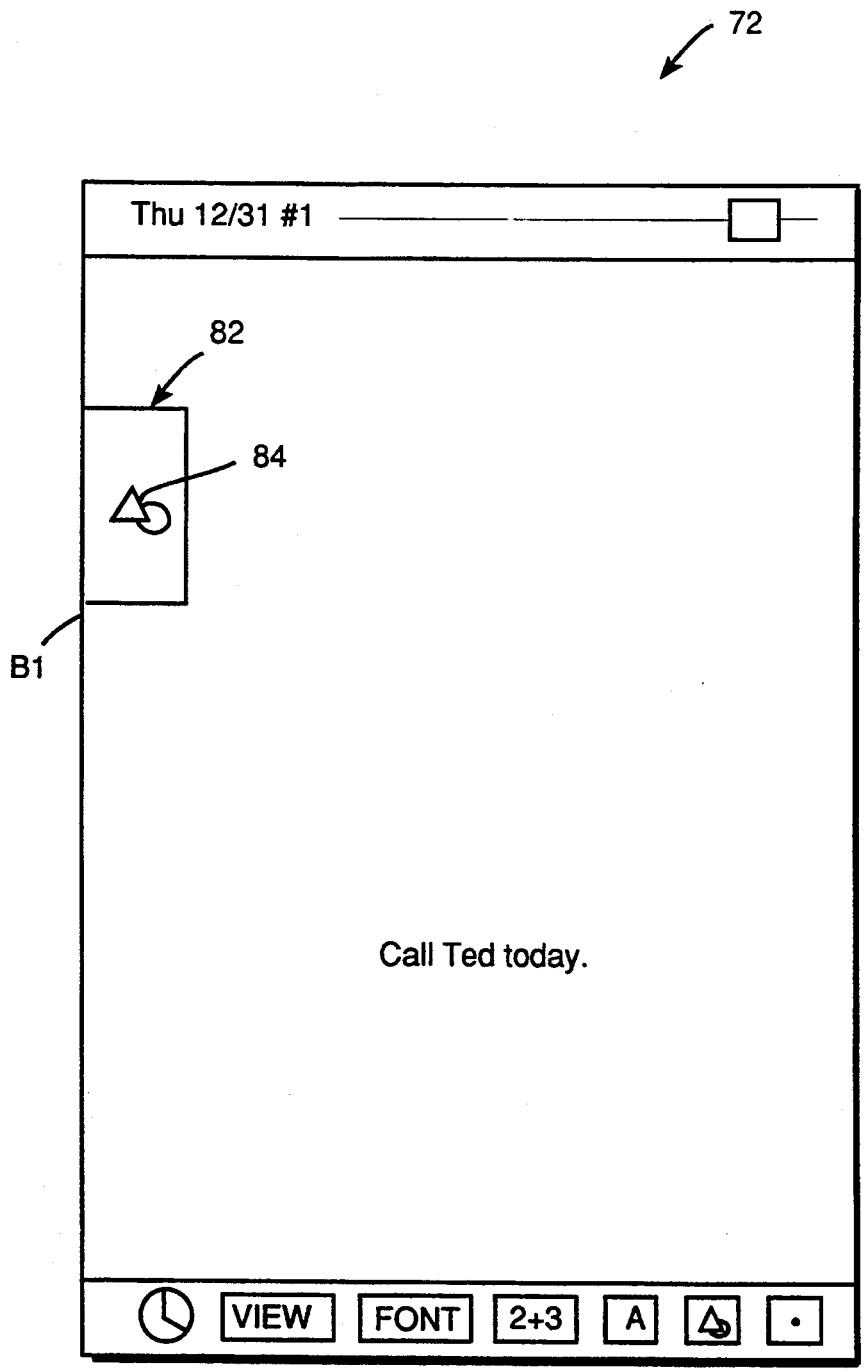
FIG. 4d illustrates the conversion of the graphical object into a clipboard icon which is attached to the boundary of the screen.

FIG. 4d illustrates a visible clipboard 82 attached to the boundary B1 of screen 72. In this instance, visible clipboard 82 includes indicia 84 indicating that the clipboard includes a graphic object. The indicia 84 is arbitrary, and in this case includes a circle partially obscured by a triangle. However any other indicia 84 (such as a square or the letter G) could also have been used to indicate that the visible clipboard 82 includes a graphical object.

The visible clipboard 82 is "attached" to the boundary B1 of screen 72. Even if a user scrolls within the application program displayed on the screen 72 or opens a new application, the visible clipboard 82 will always remain stationery and visible on the screen 82. This permits a user to move through an application and among various applications within losing sight of the visible clipboard and without forgetting the presence and contents of the visible clipboard.

Figure 4E:
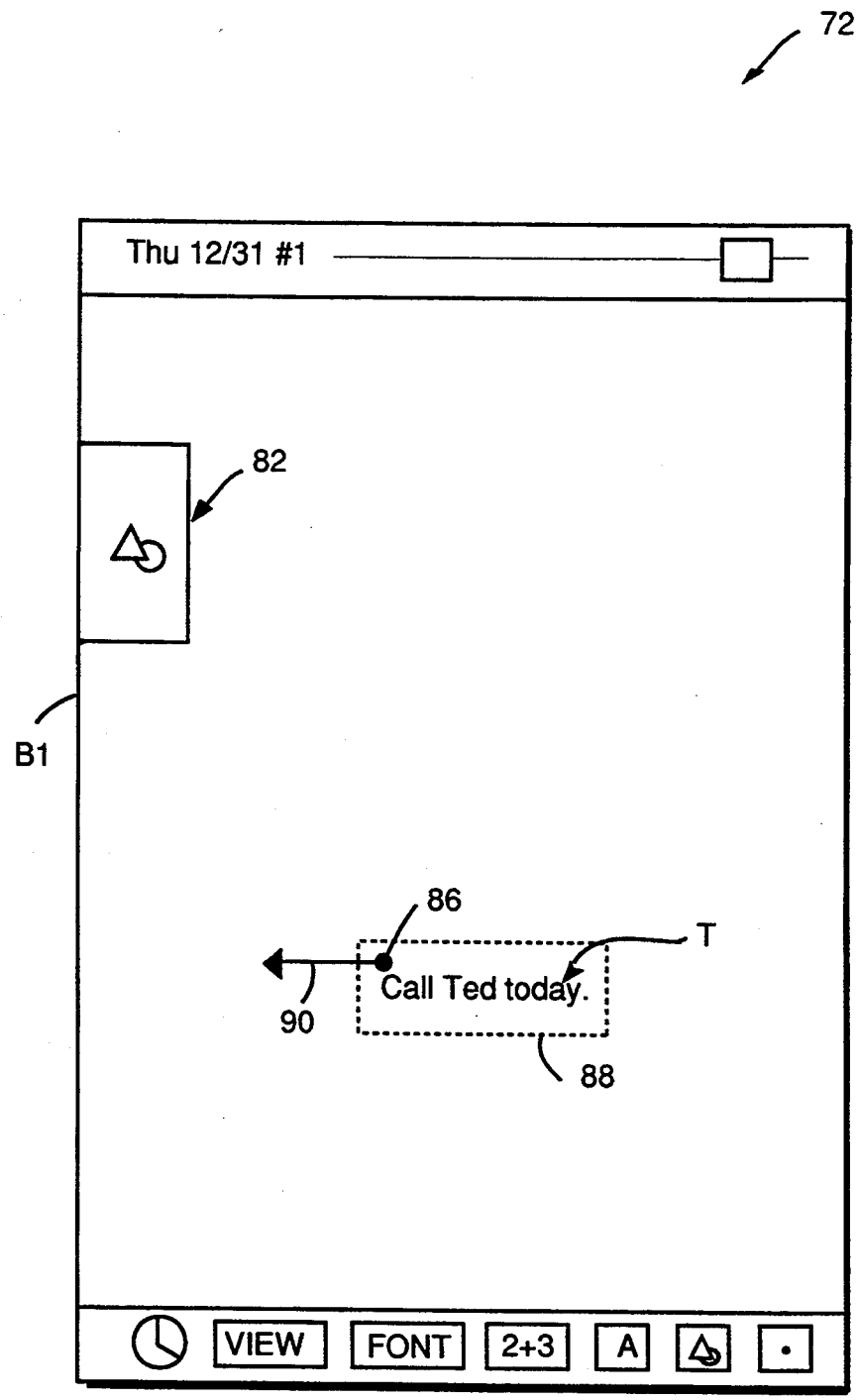
FIG. 4e illustrates the selection and dragging of the text object of FIG. 3.
Figure 4F:
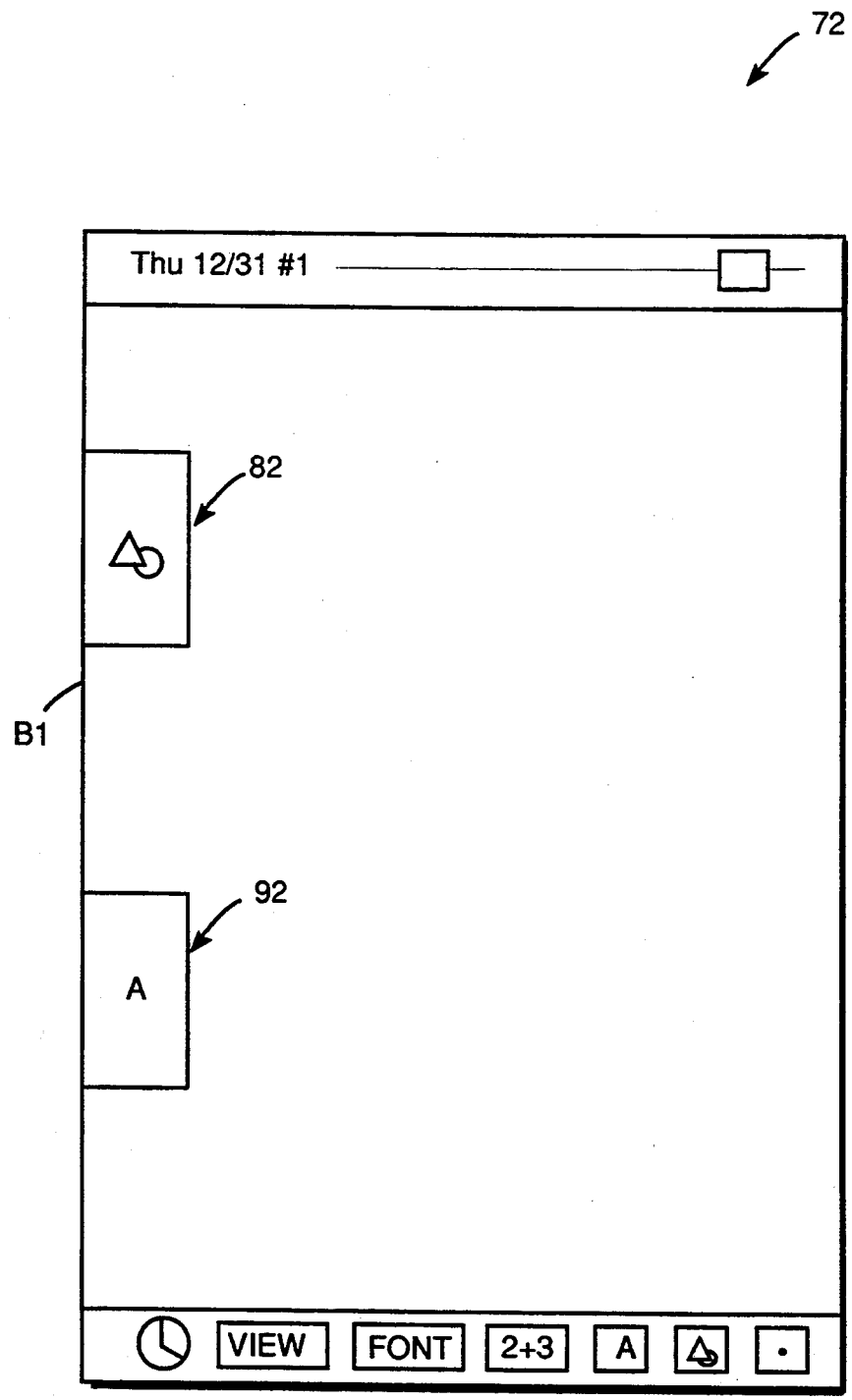
FIG. 4f illustrates the conversion of the text object into a clipboard icon which is attached to a boundary of the screen.

In FIG. 4e, text object T is selected by a point 86 created by the stylus 38. Again, the text object T has information including the coordinates of its bounding box 88, so that it is a straightforward matter to determine whether the point 86 of the stylus 38 is within the bounding box 88 and thus selecting the text object T. The text object T is dragged toward the boundary B1 by moving the point 86 along the screen 72 as indicated by the arrow 90.

When the point 86 "impinges" upon the boundary B1, a visible clipboard icon 92 is formed and is attached to the boundary B1. Again, by "impinge upon" it is meant that the point 86 of stylus 38 contacts or is near to the boundary B1.

In an alternate embodiment of the present invention, the visible clipboard icons (such as icons 82 and 92), can be formed when the graphical object or text object, respectively, impinge upon a boundary such as boundary B1. In this alternative embodiment, impingement could be determined when the bounding box for the object is sufficiently close to a boundary, or when a designated percentage (e.g. 20%) of the bounding box of the object overlaps the desired boundary. It should therefore be apparent that "impingement" can comprise any move or gesture which reasonably unambiguously indicates to the computer system 10 that a dragged object is to be converted into a visible clipboard icon and attached to a boundary of the computer screen.

Figure 4G:
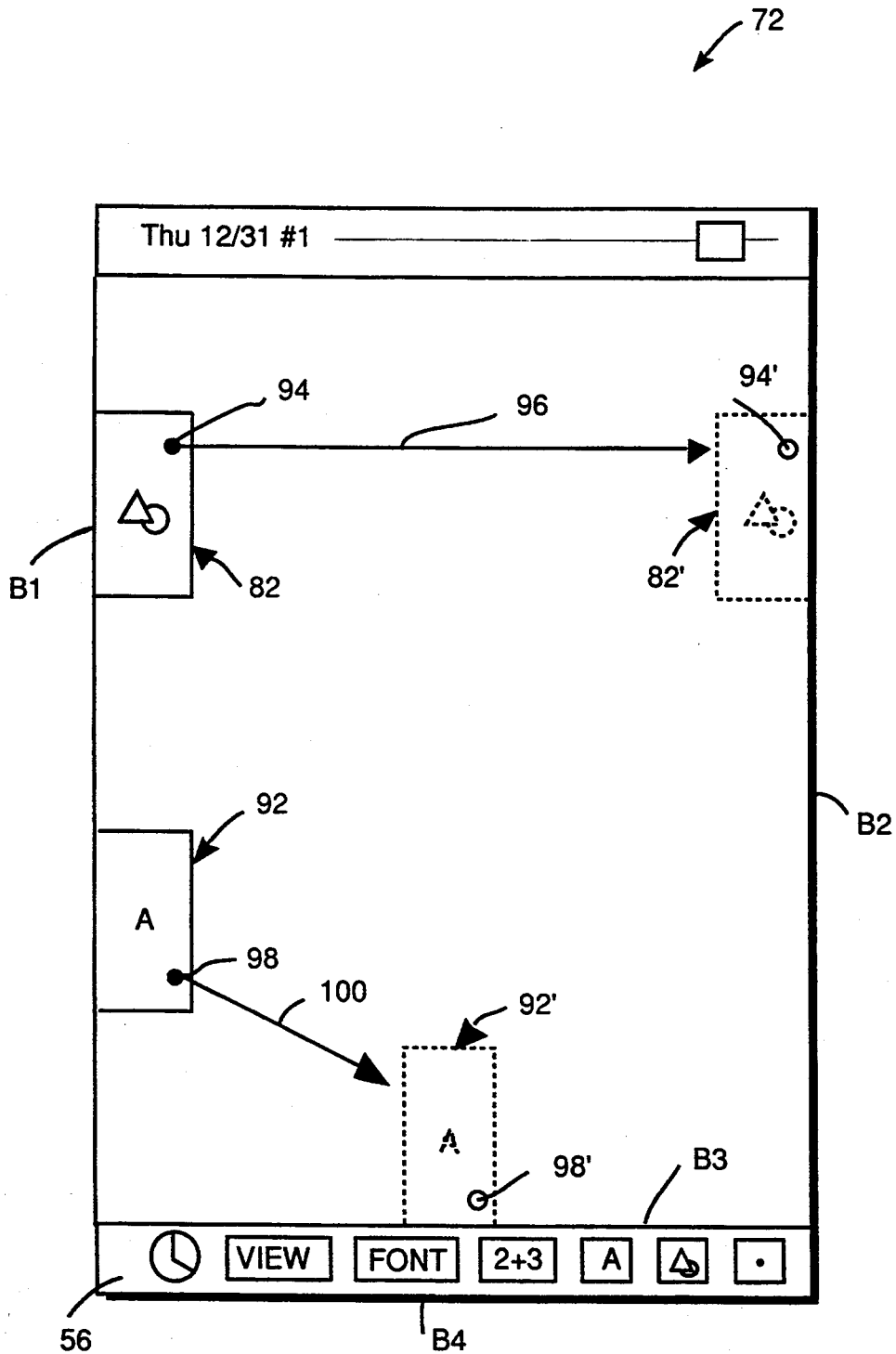
FIG. 4g illustrates the process for moving the clipboard icons to other boundaries of the screen.

In FIG. 4g, a method for repositioning the visible clipboard icons is illustrated. The original position of visible clipboard icon 82 is shown in solid lines, and a final position of the visible clipboard 82 is shown at 82' in phantom. The icon is moved from the position at 82 to 82' by contacting a point 94 within the bounding box of icon 82 with a tip of the stylus 38 and dragging the icon 82 as indicated by the arrow 94. When the point at 94' is sufficiently close or contacts a second boundary B2 of screen 72, the icon 82' attaches to the boundary B2, and the icon 82 has been successfully moved from a first boundary B1 to a second boundary B2 of the screen 72.

Still referring to FIG. 4g, the original position of visible clipboard icon 92 is shown in solid lines attached to boundary B1 of screen 72. A final position for icon 92 is shown on 92' in phantom. To move the icon from the position at 92 to the position at 92', a point 98 of the stylus 38 is placed within the bounding box of icon 92 and the icon 92 is dragged toward its final position as indicated by the arrow 100. When the point 98 reaches the location 98', the icon 92 attaches itself to the boundary B3 of the screen 72. It should be noted that in this instance the boundary B3 is an edge of the status bar 56, and not the boundary B4, which is the bottom edge of the screen 72. The icon 92 could be attached to the boundary B4 by continuing to move the point 98 through the status bar 56 to the boundary B4.

It should once again be noted that parameters of the icons themselves rather than the point of the stylus could determine whether the icon had "impinged" upon a boundary of the screen 72. For example, if one of the edges of the icons 82 or 92 contacts or is sufficiently close to a boundary of the screen 72, this gesture could be used to indicated that the icon is to be attached to that boundary. Alternatively, an overlap of a certain percentage of the visible clipboard icon with a boundary (e.g. 20% of the icon) could indicate that the icon is to be attached to that boundary. Therefore, it is once again intended that the "impingement" of a visible clipboard icon upon a boundary be interpreted as any gesture or movement with a stylus or other pointing mechanism which indicates that an icon is to be attached to a boundary of the screen.

Figure 4H:
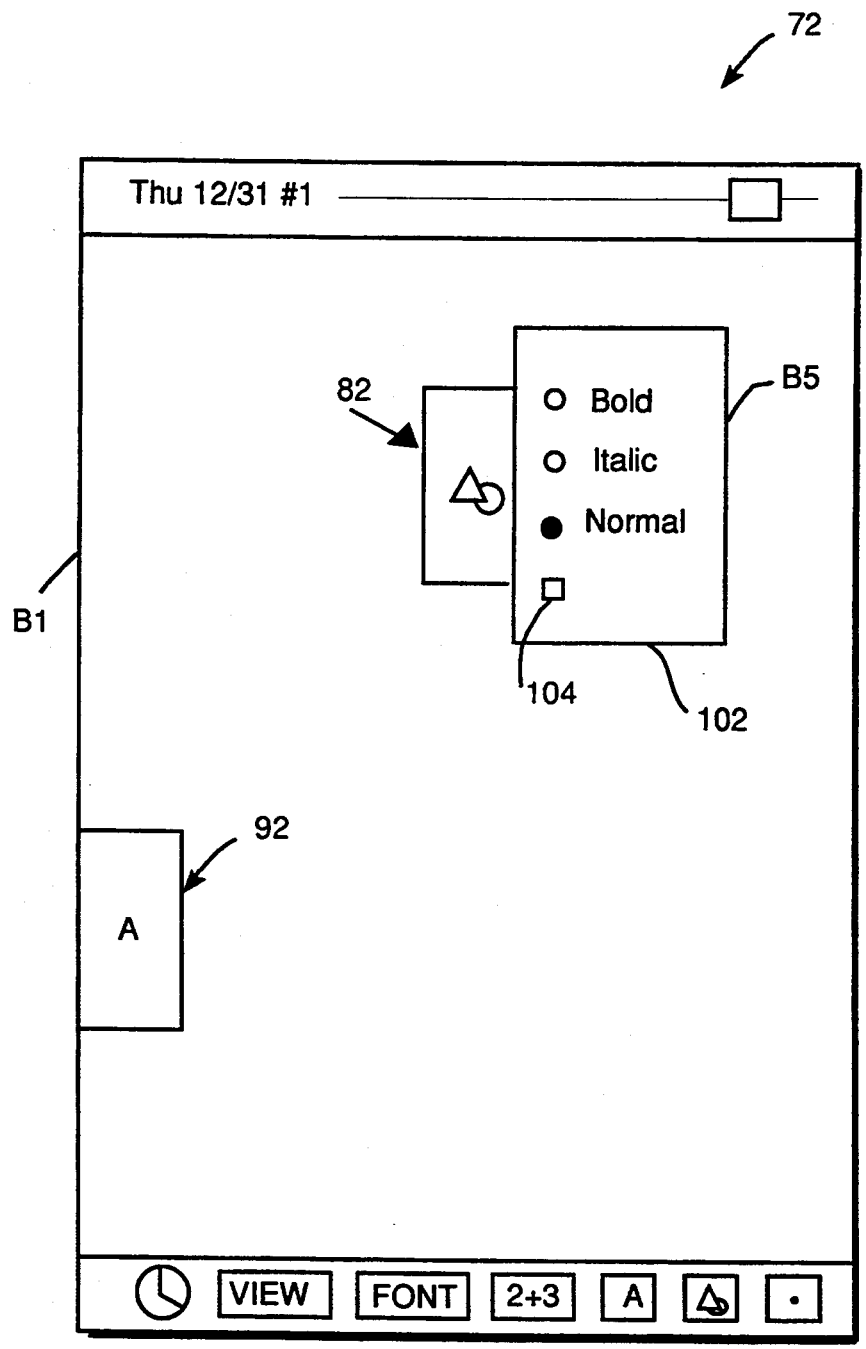
FIG. 4h illustrates the attachment of a clipboard icon to a boundary provided in a central location of the screen.

In FIG. 4h, the visible clipboard icon 92 remains attached to the boundary B1 of screen 72, but the visible clipboard icon 82 has been moved (as described previously) and attached to a boundary B5 of a palette 102. Palettes such as palette 102 are "popped" onto the screen 72 to perform a variety of functions. In this case, the palette 102 allows the user to select bold, italic, or normal fonts. The palette 102 remains stationary on the screen until removed by the activation of a "close box" 104 with stylus 38. As such, the palette 102 provides a useful boundary B5 to which a visible clipboard 82 can be attached.

Figure 5A:
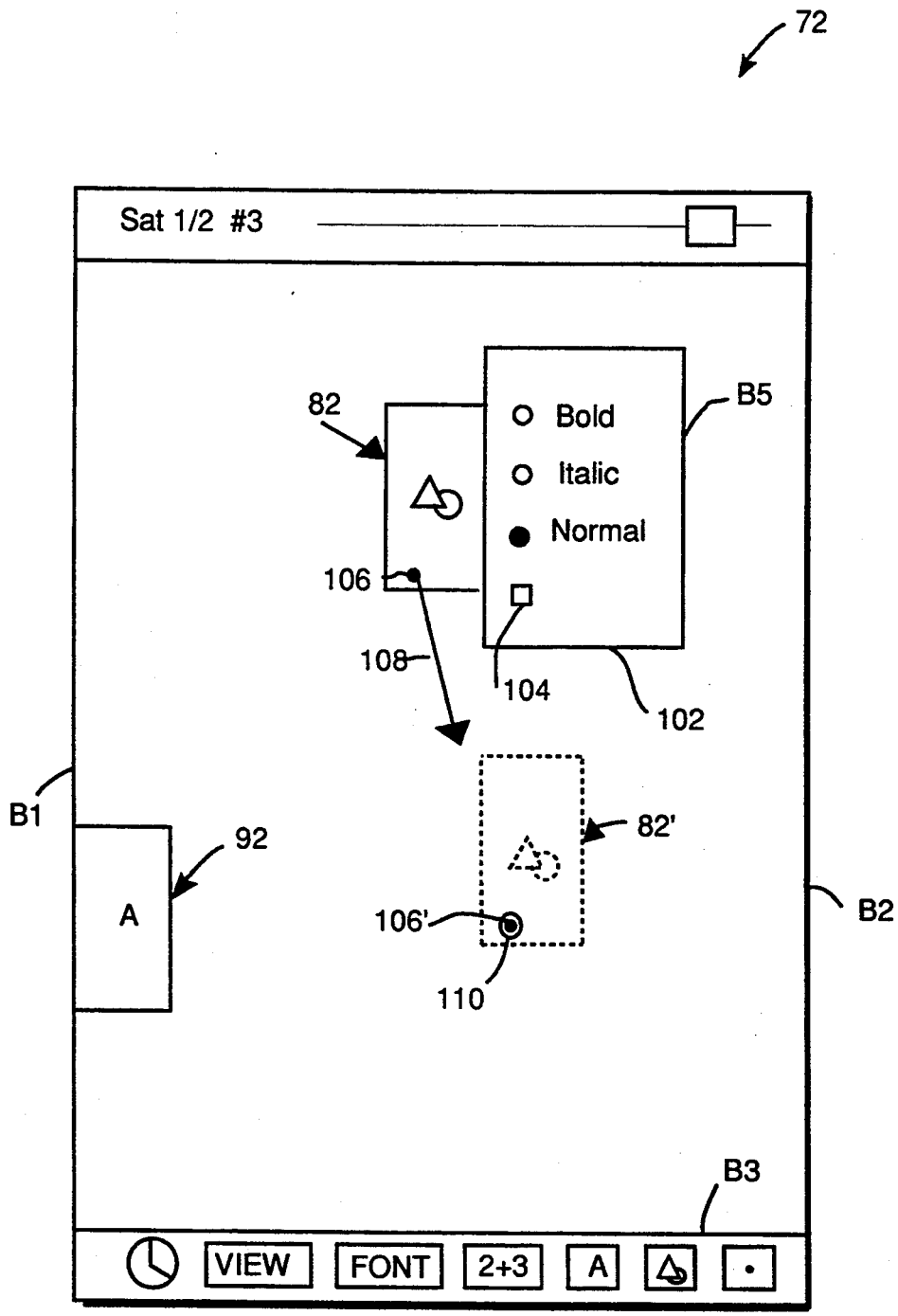
FIG. 5a illustrates the selection and dragging of a clipboard icon in preparation of pasting the contents of the icon into an application program.

In FIG. 5a, the visible clipboard icon 82 is shown attached to the boundary B5 of palette 102 and the visible clipboard icon 92 is shown attached to the boundary B1 of the screen 72. Icon 82 is selected by placing a point 106 of the stylus 38 within its bounding box, and is dragged to a new position 82' as indicated by the arrow 108. Once at the position 82', the point 106' of the stylus is lifted from the screen as indicated by the circle 110. Since the point 106' is not near any boundary of the screen 72, i.e. is not near any boundary such as B1-B5, the computer system 10 determines that this is a gesture indicating that the contents of the visible clipboard 82 are to be pasted to the application program at or near the point 106'.

Figure 5B:
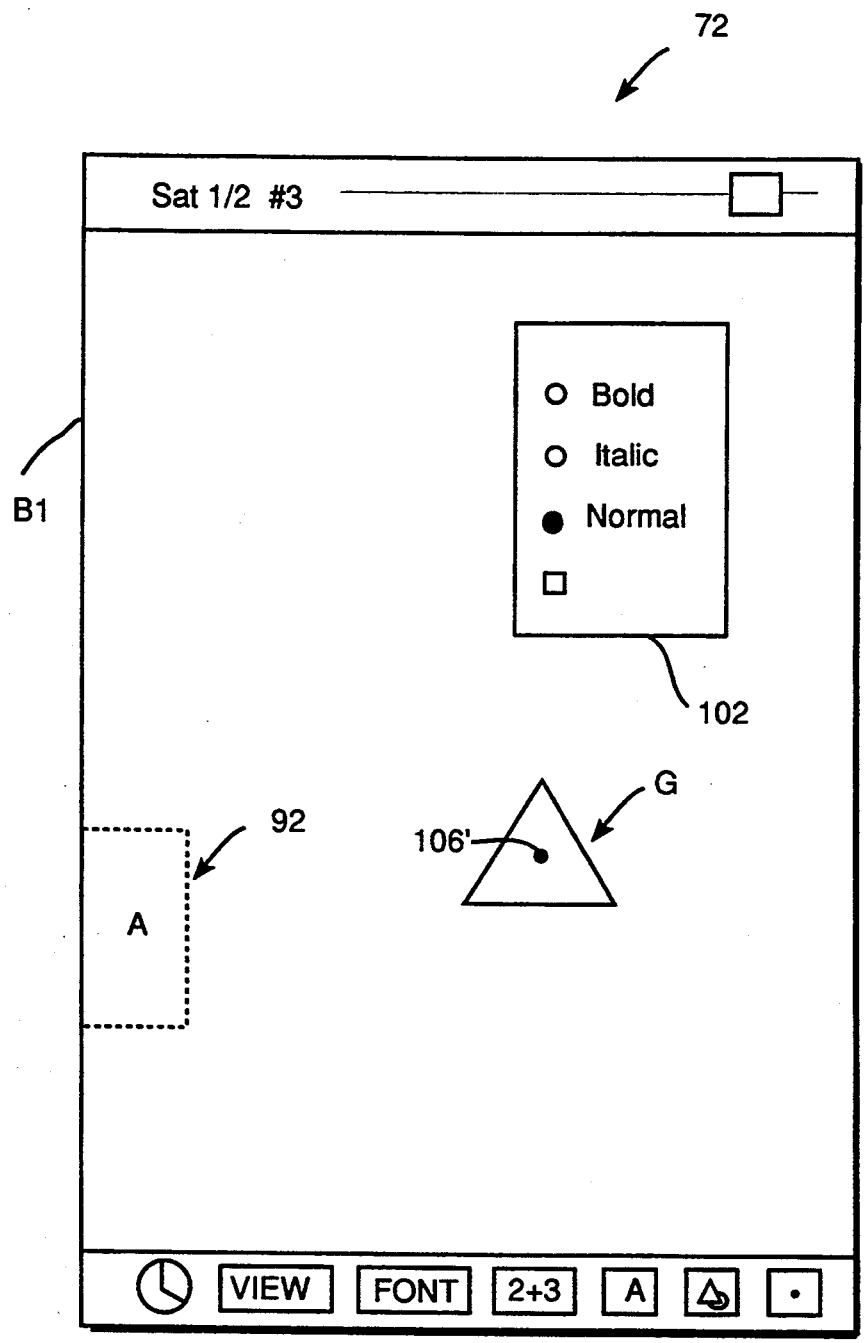
FIG. 5b illustrates the graphical object which has been pasted into the application program.

In FIG. 5b, the graphical object G that had been "carried" by the visible clipboard 82 has been "pasted" into the notepad application centered at the point 106' where the stylus 38 left the screen 72. Of course, the graphic object G could be pasted at other positions relative to point 106'. For example, the point 106' could comprise the lower left-hand corner of the bounding box for the graphic object G.

Figure 5C:
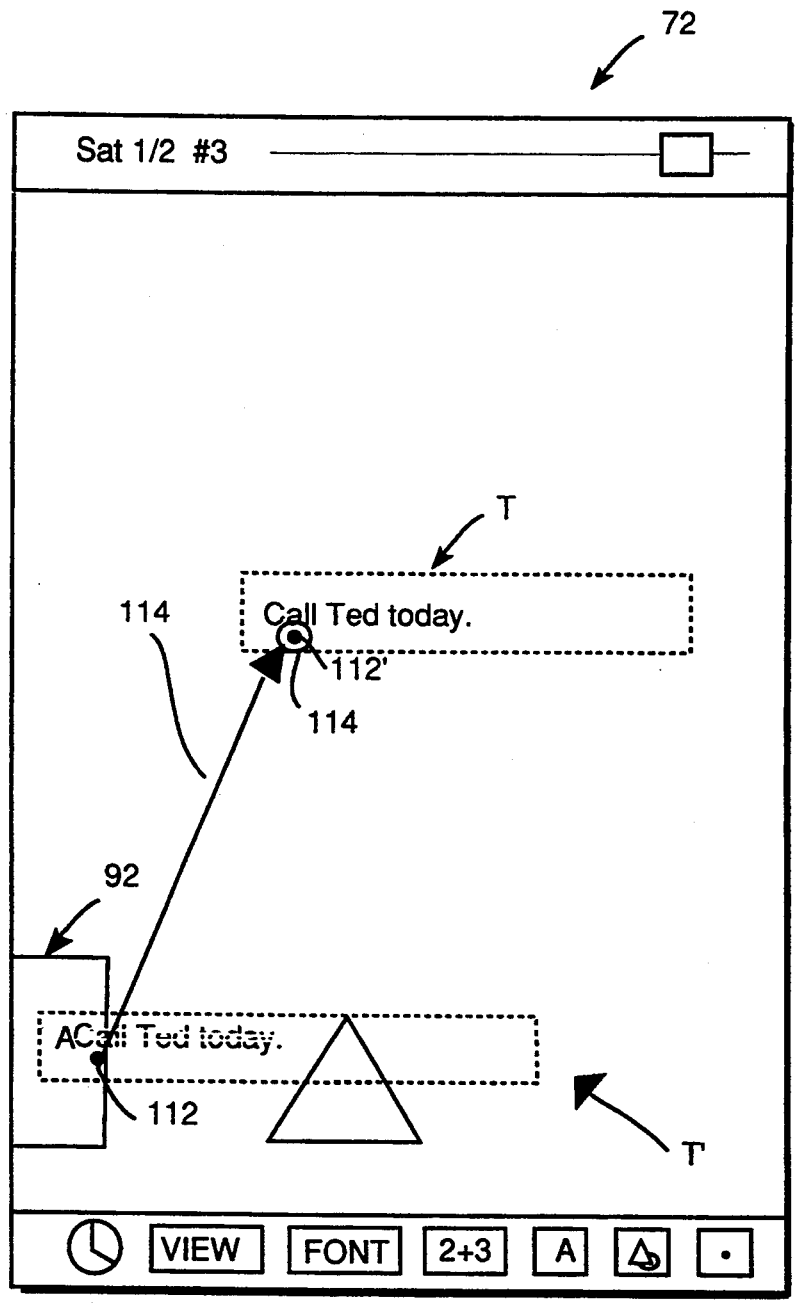
FIG. 5c illustrates the selection of a clipboard icon, its conversion into a text object, and the dragging and final disposition of the text object.

In FIG. 5c, visible clipboard icon 92 can be selected by placing a point 112 of stylus 38 near or within its bounding box. In this instance, the selection of the icon 92 causes a text object T' to appear on the screen which can be dragged as indicated by the arrow 114. When the point of the stylus 38 reaches the point 112', it can be lifted from the screen as indicated by circle 114 to "paste" the text object T at that location.

It is therefore apparent that there are several embodiments for a process for moving a visible clipboard icon. In one process, the icon is moved without modifying the visual appearance of the icon, and then is either attached to another boundary or is converted into an object image on the screen 72. In the second process, the visible clipboard icon is converted into the object that it is carrying, which is then dragged across the screen 72 to either be placed into an application program or to be reconverted into a visible clipboard icon if it impinges upon another boundary. The advantage of the second process is that a user can see the object and therefore more accurately position the object for pasting into the application program.

Figure 5D:
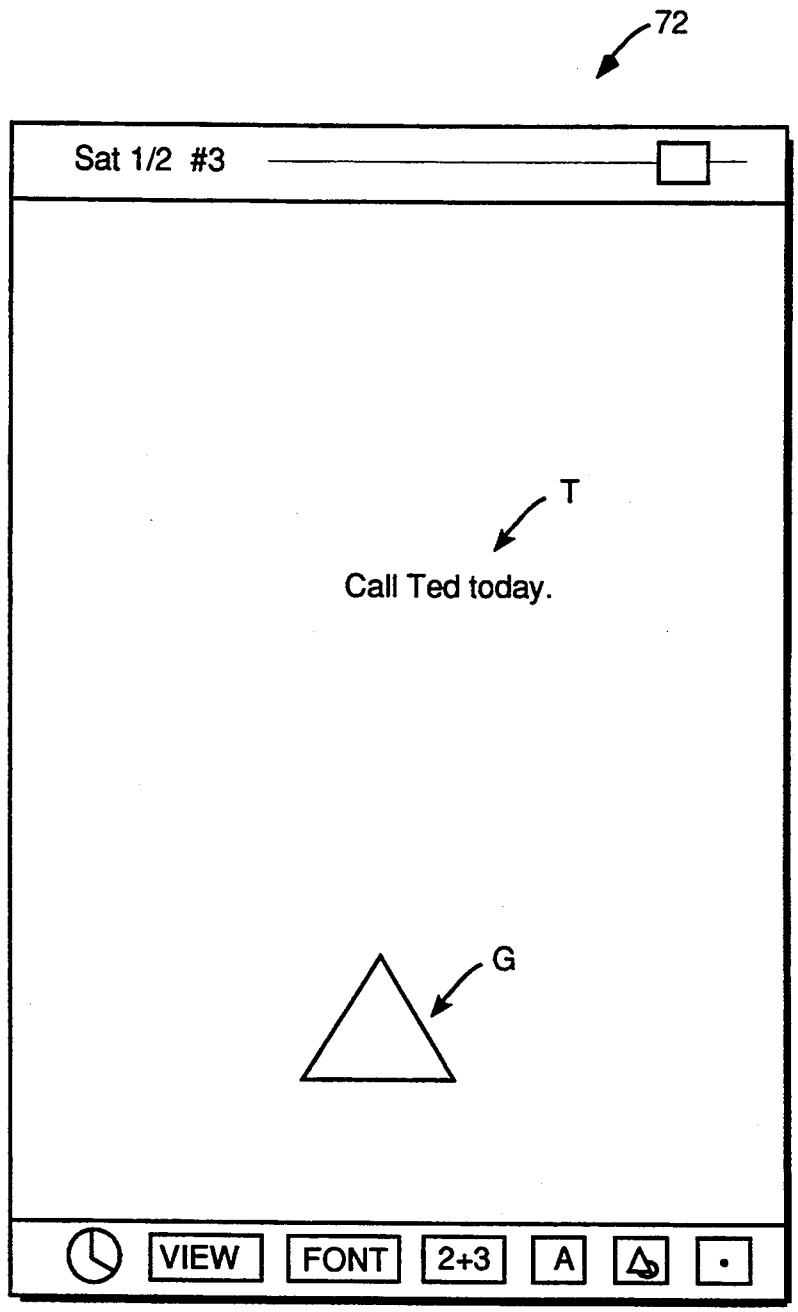
FIG. 5d illustrates the computer screen after the contents of the clipboards have been pasted into an application program.

FIG. 5d illustrates the final positions for the graphic object G and the text object T on the a computer screen 72. It should be noted that these objects have been moved from the first note of Thursday, December 31st to the third note of Saturday, January 2nd. This was accomplished by scrolling or jumping from Thursday, December 31st to Saturday, January 2nd within the notepad application program. During this scrolling or jumping process, the visible clipboard icons 82 and 92 remained visible at all times. Once the text object T and graphic object G have been pasted into the desired location in the application program, the visible clipboard icons are preferably erased from memory.

The described stylus gestures, objects, and processes are preferably accomplished within the context of a "view system". In such a view system, various "views" or "objects" are stacked on top of each other, like pages of paper on a desk top. These views include a root view (such as the notepad) and virtually any number of views (within the limitations of the system) stacked on top of the root view.

The view system is a software routine which returns two pieces of information when the screen engaged ("tapped") with a stylus. A first piece of information returned which view or "object" was tapped. The second piece of information returned is the position of the tap on the tapped view. This location information is often returned in the form of Cartesian (x-y) coordinates. The view system therefore handles much of the routine input work for the computer system. Taps by stylus on non-active areas of the screen can be ignored by the view system. Likewise, inappropriate inputs on active areas of the screen can be ignored or can generate error conditions which may or may not be acted upon by the system.

Figure 6:
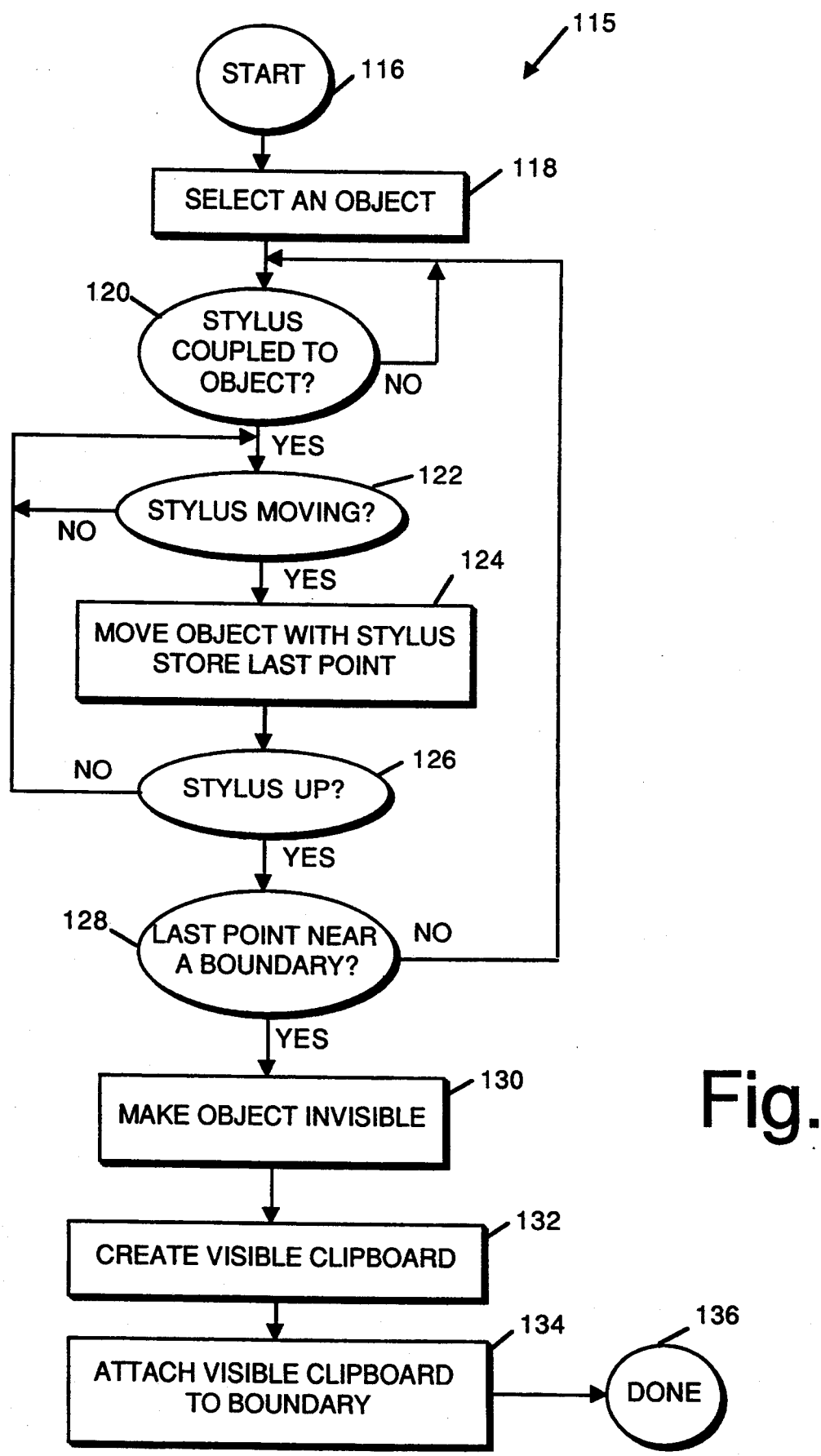
FIG. 6 is a flow diagram of the process steps of the present invention for creating a visible clipboard.

FIG. 6 illustrates a process 115 for creating a visible clipboard from an object displayed on a computer screen. The process 115 begins at 116, and an object is selected on the screen of a computer system 10 in a step 118. Method for selecting objects on a screen are well-known to those skilled in the art. A preferred method for selecting objects on the screen of a pen-based computer system, such as computer system 10, are detailed in co-pending U.S. patent application Ser. No. 07/888,741 filed May 26, 1992 on behalf of S. Capps, entitled "Methods for Selecting Objects on a Computer Display" and assigned the assignee of the present invention, said application being hereby incorporated by reference in its entirety.

Next, in a step 120, it is determined whether the stylus is "coupled" to an object on the computer screen. Preferably, a stylus is determined to be coupled to an object if its point falls within the bounding box defined by the object. Alternatively, a stylus could be coupled to an object by touching the point of the stylus to a point on the bounding box, or on a point outside but near the bounding box.

If it is determined by step 120 that the stylus is coupled to an object, it is determined in a step 122 whether the stylus is moving. Such algorithms are well-known to those skilled in the art. For example, small random movements around the initial point (e.g. 1-2 pixels) are probably to be ignored. However, if the stylus moves greater than a distance $\Delta d$ (e.g. 3-4 pixels) in any one direction, it can be assumed that the stylus is moving. If not, step 122 goes into a wait state.

Next, in a step 124, the object is caused to move with the stylus. As explained previously, this can be easily accomplished by determining the $\Delta x$ and $\Delta y$ of the stylus point during a period of time $\Delta t$. Also the last detected point LASTPOINT of the stylus is stored in the step 124.

In a step 126 it is determined whether the stylus has been lifted from the screen. If it has not, process control is returned to step 122. If the stylus has been lifted from the screen, a step 128 determines whether LASTPOINT is near a boundary of the screen. If it is not, process control is returned to step 120. If it is, the object is made invisible in a step 130 and a visible clipboard is created in a step 132. Step 134 attaches the visible clipboard to the boundary near LASTPOINT and the process 115 is completed at 136.

The step 130 of making an object invisible can be easily accomplished in object oriented frame systems such as that implemented on computer system 10. The object is not erased from memory by the step 130 but, rather, the frame which defines the object is instructed to no longer project an image of the object on the screen.

The step 132 of creating the visible clipboard is likewise easily implemented by object oriented programming. For example, a clipboard template can be provided upon which indicia indicating the type of object carried by the clipboard can be pasted. Alternatively, a number of alternative clipboards (e.g. a graphics clipboard, a text clipboard, a graphics and text clipboard, etc.) can be provided and called up, as appropriate, by step 132.

The step 134 of attaching the visible clipboard to a boundary can be easily implemented by aligning the closest side of the boundary box for a visible clipboard with the boundary closest to LASTPOINT. If the boundary is a straight line, the edge of the boundary and the edge of the clipboard can be made to coincide. If the boundary is curved or a point, the side of the clipboard can be made tangential to the boundary or point near LASTPOINT.

The term "object" has been used extensively in this preceding discussions. As is well known to software developers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well know texts which describe object oriented programming. See, for example, Object Oriented Programming for the Macintosh, by Kurt J. Schmucher, Hayden Book Company, 1986.

Figure 7:
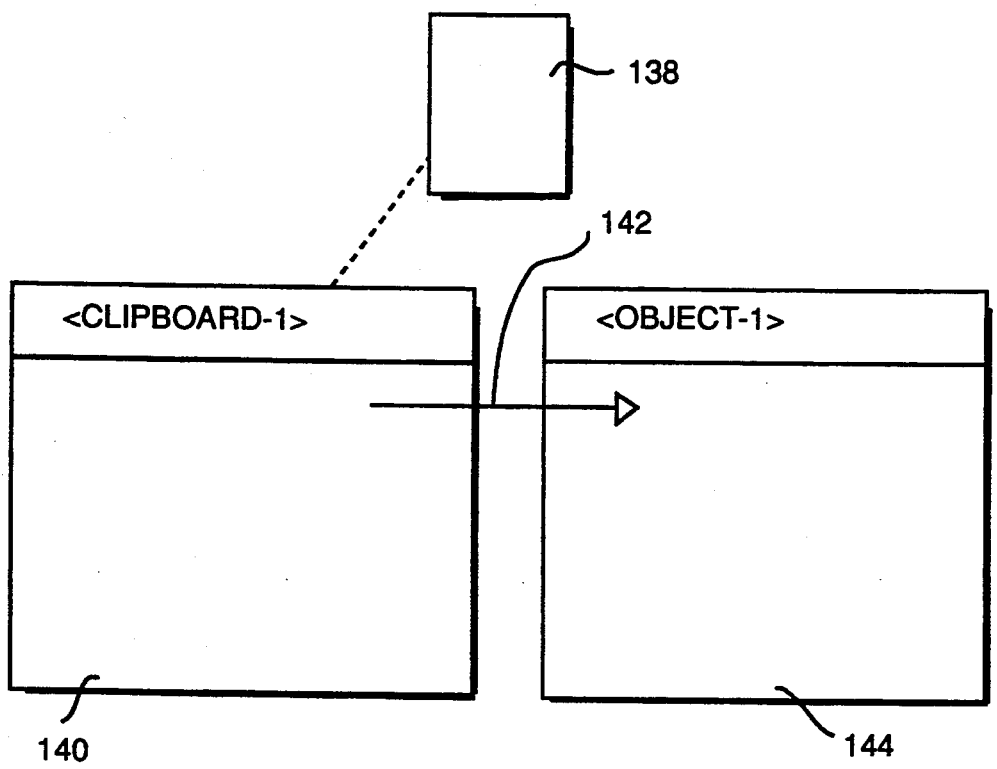
FIG. 7 illustrates the relationship between the clipboard icon and the object that it represents.

In FIG. 7, a visible clipboard icon 138 is preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

Still referring to FIG. 7, to create a visible clipboard icon 38, a frame 140 entitled <CLIPBOARD-1> is created. The icon 138 on the screen is merely a projected image provided by the frame (object) 140. The frame 140 includes a pointer 142 to a frame 144 which defines the selected object (in this case <OBJECT-1>). The visible clipboard icon 138 is projected on the screen by instructing the frame 140 to project an image on the screen at a particular location. The icon 138 can be moved on the screen by updating the x-y location of the icon 138 in the frame 140. Likewise, the icon 138 can be replaced by object stored in <OBJECT-1> by instructing the frame 140 to remove the icon 138 from the screen and by instructing the frame 144 (which is coupled to the frame 140 by the pointer 142) to project the image of the objet store in <OBJECT-1> on the screen.

Figure 8A:
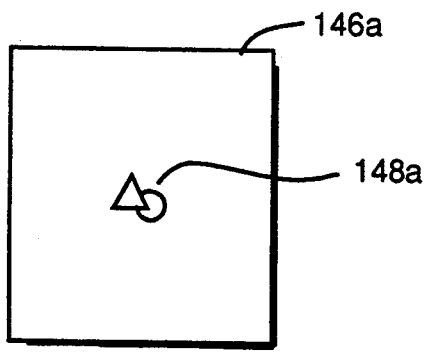
FIGS. 8a-8c illustrate three possible indicia for indicating the contents of the visible clipboards.
Figure 8B:
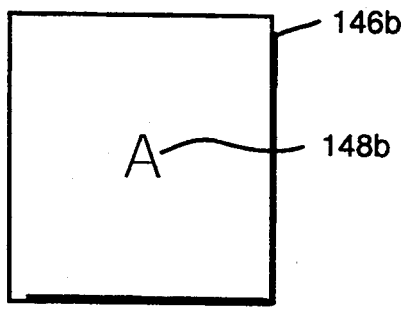
Figure 8C:
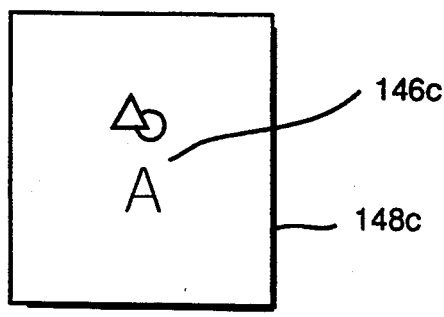

FIGS. 8a–8c illustrate visible clipboard icons having various forms of indicia indicating the contents of the clipboard. In FIG. 8a, a visible clipboard icon 146a includes indicia 148a indicating that a graphical object is carried by the clipboard. In FIG. 8b, a visible clipboard icon 146b includes indicia 148b which indicates that a text object is carried by the clipboard. In FIG. 8c, a visible clipboard icon 146c includes indicia 148c indicating that a combination text and graphical object is carried by the clipboard.

Figure 9A:
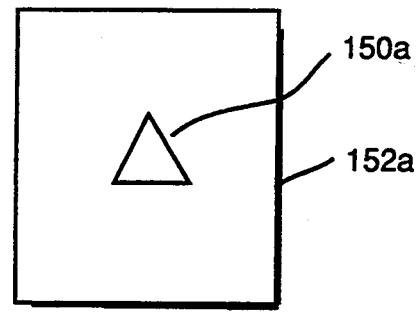
FIGS. 9a-9c illustrate three alternative indicia for indicating the contents of the visible clipboards.
Figure 9B:
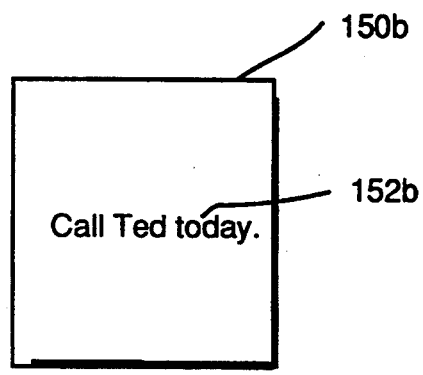
Figure 9C:
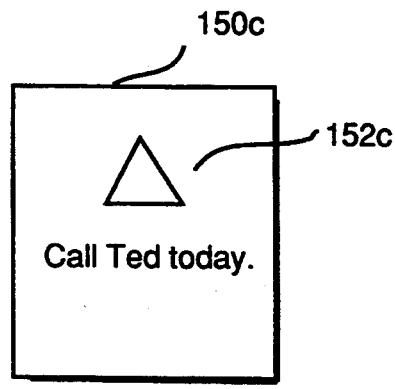

FIGS. 9a–9c illustrate three visible clipboard icons having indicia indicating the actual content of the clipboard, rather than just the content type as was the case with FIGS. 8a–8c. In FIG. 9a, a visible clipboard icon 150a includes indicia 152a which is a miniature version of the actual graphical object carried by the icon 150a. To create the indicia 152a, the graphical object is scaled downwardly within the limits of resolution of the screen. Techniques for scaling objects are well-known to those skilled in the art. In FIG. 9b, a visible clipboard icon 9b is provided with indicia 152b which, again, is a scaled-down version of an actual text object carried by the icon 150b. As can be seen in FIG. 9b, resolution limits of the screen may result in unreadable or only semi-readable text objects, but the overall appearance of the text object remains the same. In FIG. 9c, a visible clipboard icon 150c carries an object which includes both text and graphics and, accordingly, a miniaturized version of the object carried by the visible clipboard icon 150c is displayed as indicia 152c. Again, due to limits of resolution of the computer screen, the contents of the object carried by the clipboard 150c may not be fully readable, but the overall appearance is retained.

In FIG. 10a, the process 154 for moving a visible clipboard is illustrated. The process starts at 156 and, in a step 158 it is determined whether the stylus is "coupled" to a visible clipboard. By "coupled" it is meant that the stylus 38 has unambiguously selected a visible clipboard icon. For example, the tip of a stylus to be placed within the visible clipboard icon, on its periphery, or sufficiently near to the clipboard that the clipboard is determined to be selected. If not, the step 158 enters a wait state. If the result of the decision step 158 is "yes," in decision step 160 determines whether the stylus is moving. Again, this is implemented by analyzing Δx and Δy of the stylus tip within a short period of time Δt. If the stylus is not moving, the step 160 goes into a wait state. If the stylus is moving, a step 162 causes the visible clipboard to move with the stylus and stores the last detected point LASTPOINT of the stylus on the screen. A step 164 determines whether the stylus is up and, if not, process control is returned to step 160. If the stylus is up, a decision step 166 determines whether LASTPOINT is near a boundary. Again, the boundary can be the physical boundary at the end of the screen, or any artificial boundary provided within the screen view area. If LASTPOINT is near a boundary, a step 168 attaches the visible clipboard to the boundary. As explained previously, this step 168 can be accomplished by coinciding the edge of the visible clipboard icon that is nearest to the boundary with the edge of the boundary. Alternatively, other attachment relationships (such as a "tether" between the visible clipboard and the boundary) can also be used. The process 154 is then completed as indicated at 170.

If step 166 determines that LASTPOINT is not near a boundary then a step 172 makes the visible clipboard icon invisible. This is preferably accomplished by instructing the frame associated with the visible clipboard icon to remove the image from the screen of the computer. Next, in a step 174, the object associated with the previously visible clipboard icon is made visible at LASTPOINT. Again, this is preferably accomplished by instructing the frame containing the object to project the object's image onto the screen in some reasonable relationship to LASTPOINT. Finally, in a step 176, the newly visible object is integrated into the view system described previously. The process is then completed as indicated at 170.

Figure 10B:
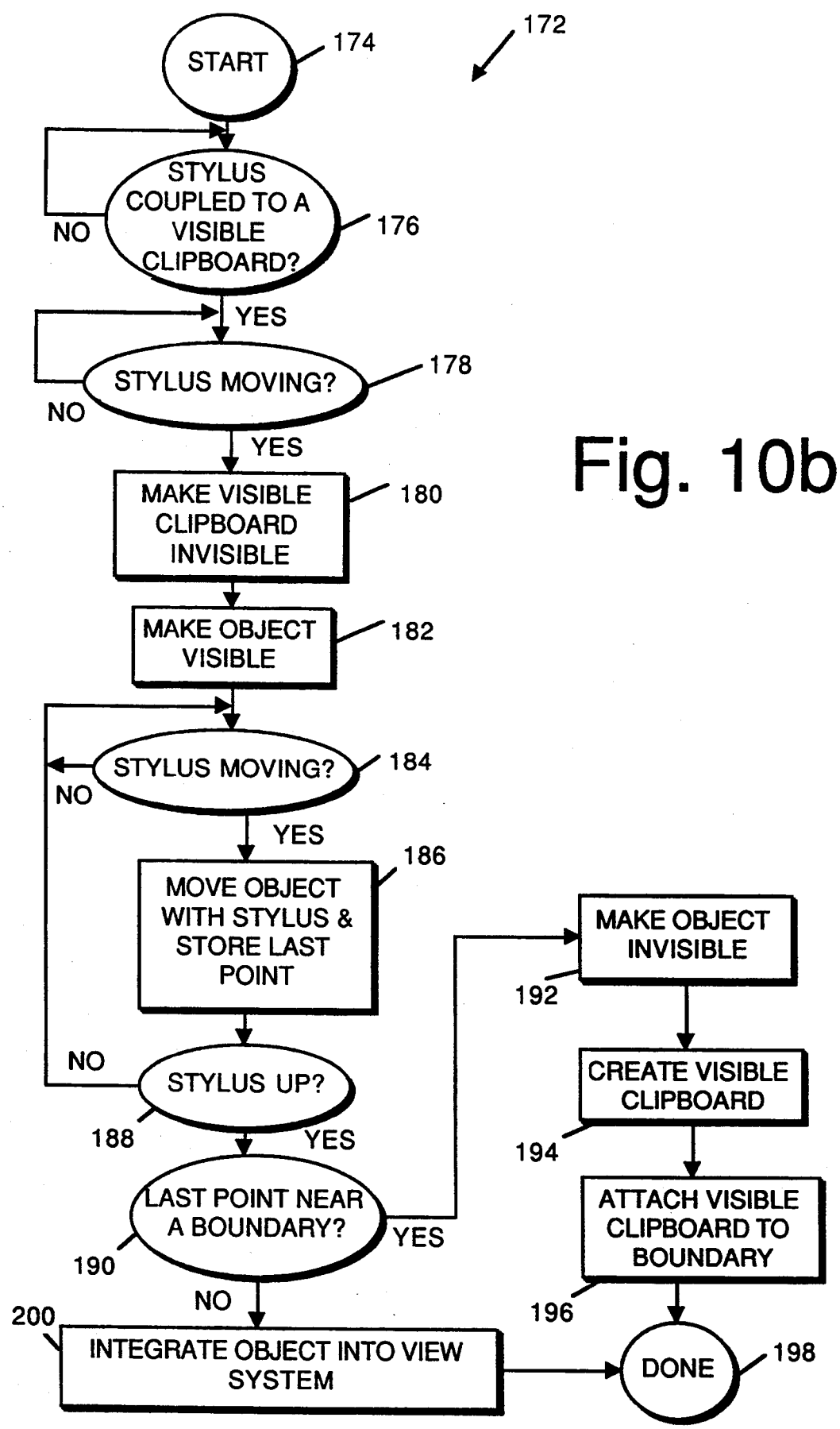
FIG. 10b is a flow diagram of an alternative process for moving a visible clipboard and for pasting the content of the clipboard into an application program.

In FIG. 10b, an alternative process 172 for moving a visible clipboard icon is illustrated. The process begins at 174, and in a decision step 176 this determined whether the stylus is coupled to a visible clipboard icon. Again, "coupled" preferably means that the stylus is on or near the icon. If it is not, the process goes into a wait state. If the stylus is coupled to a visible clipboard icon, a step 178 determines whether the stylus is moving. If the stylus is not moving, the process again goes into a wait state. If the stylus is moving, the visible clipboard is made invisible in a step 180 as described previously, and the object carried by the visible clipboard is made visible in a step 182, as also described previously.

In a decision step 184 it is determined if the stylus is still moving. If not, the process goes into a wait state. If the stylus is moving, a step 186 moves the object with the stylus and stores the last detected point of the stylus in a variable LASTPOINT. Next, in a step 188, it is determined whether the stylus has been removed from the screen of the computer. If it has not, process control is returned to step 184. If the stylus has been removed from the computer screen, it is determined in a step 190 whether LASTPOINT is near a boundary of the screen. If it is, a step 192 makes the object invisible and a step 194 creates a visible clipboard icon. As before, the step of creating a visible clipboard icon preferably includes the provision of indicia on the icon which indicates the content of the clipboard. Next, in a step 196, the visible clipboard is attached to a boundary, and the process is completed as indicated at 198. If step 190 indicated that the LASTPOINT was not near a boundary, the displayed object is simply integrated into the view system in a step 200 and the process is again completed at 198.

While this invention has been described in terms of several preferred embodiments, there are alterations, permutations, and equivalents which fall within the scope of this invention. For example, the processes have been described in terms of moves (i.e. cut-and-paste) rather than copies (copy-and-paste). The processes can be easily modified for copying by creating a new frame for an selected-and-dragged object, and leaving the originally selected frame intact. In this way, the selected object remains in its original location, and a copy of the object is dragged to form a visible clipboard. The copy of the object can be shown in phantom to indicate that it is different from the original object.

It is therefore intended that the following appended claims be interpreted as including all such alterations, permutations, and equivalents as fall within the true spirit and scope of the present invention.

What is claimed is:

1. A method for moving a clipboard icon comprising the steps of:
    selecting a clipboard icon on a computer screen having a boundary;
    dragging said clipboard icon on said computer screen with a pointing device; and
    depositing said clipboard icon, wherein when the clipboard icon is deposited at a location that impinges the boundary on said computer screen, the clipboard icon is displayed in its deposited location, and wherein when said clipboard icon is deposited at a location that does not impinge the boundary on said computer screen, the clipboard icon is converted to an image of application data that is stored within a clipboard memory and the image of said application data is displayed on said computer screen at the deposit location and the application data is inserted in an application program file at a position that corresponds to the deposit location.

2. A method for moving a clipboard icon as recited in claim 1 wherein said computer screen is a screen of a pen-based computer system, and wherein said step of dragging the clipboard icon is accomplished with a stylus.

3. A method for moving a clipboard icon as recited in claim 2 wherein said clipboard icon is deposited when a boundary on said computer screen is impinged, and the clipboard icon is displayed in its deposited location when the boundary is impinged, and wherein said boundary is impinged when said stylus is within a predetermined distance of said boundary.

4. A method for moving a clipboard icon as recited in claim 3 wherein said predetermined distance is zero.

5. A method for moving a clipboard icon as recited in claim 2 wherein said clipboard icon is deposited when a boundary on said computer screen is impinged, and the clipboard icon is displayed in its deposited location when the boundary is impinged, and wherein said boundary is impinged when said clipboard icon is within a predetermined distance of said boundary.

6. A method for moving a clipboard icon as recited in claim 1 wherein when the clipboard icon is deposited at a location that does not impinge the boundary on the computer screen the entire image of the application data is displayed on the computer screen.

7. A system for moving a clipboard icon comprising:
    a computer screen for displaying images, the computer screen having a boundary;
    selection means for selecting an image of application data displayed on the screen;
    image moving means for moving the selected image until the boundary on the computer screen is impinged, without moving an application program window that contains the selected application data;
    removal means for removing the selected image from the computer screen when the boundary is impinged and for removing the application data corresponding to the selected image from its associate application program file;
    storage means for storing the application data represented by the image in a clipboard memory; and
    display means for displaying a clipboard icon proximate to the boundary, the clipboard icon being arranged to represent the selected image when the selected image is removed by the removal means due to impingement of the boundary.

8. A system for moving a clipboard icon as recited in claim 7 wherein the computer screen is the screen of a pen-based computer system, and wherein the selection means includes a stylus.

9. A system for moving a clipboard icon as recited in claim 8 wherein the selection means further includes gesture recognizing means for recognizing a selection gesture that takes the form of a predetermined pattern of contact between the stylus and the computer screen.

10. A system for moving a clipboard icon as recited in claim 8 wherein the image moving means includes gesture recognizing means for recognizing an image moving gesture that takes the form of a predetermined pattern of contact between the stylus and the computer screen.

11. A system for moving a clipboard icon as recited in claim 10 wherein the selection gesture includes a drag gesture whereby the stylus engages the selected image and drags the image across the screen.

12. A system for moving a clipboard icon as recited in claim 7 wherein the entire image of the selected application data is displayed on the computer screen while the image moving means is moving the image.

13. A method of storing application data displayed on a computer screen into a clipboard memory, the method comprising the steps of:
- selecting application data displayed at a first location on the computer screen;
- dragging an image of the selected application data across the computer screen using a pointing device, without moving an application program window that contains the selected application data;
- replacing the selected application data with a clipboard icon when a boundary on the computer screen is impinged;
- storing the selected application data in the clipboard memory associated with the clipboard icon when the selected application data is replaced with the clipboard icon; and
- removing the selected application data from its associated application program file.

14. A method of storing application data as recited in claim 13 wherein the entire image of the selected application data is displayed on the computer screen throughout the dragging step.

15. A method of storing application data as recited in claim 13 wherein an image of the application data is retained at the first location.

16. A method of storing application data as recited in claim 13 wherein the application data is replaced with the clipboard icon when the application data is first selected.

17. A method of storing application data as recited in claim 13 wherein the computer screen is a screen of a pen-based computer system, and the steps of selecting application data and of dragging an image of the application data is accomplished with a stylus.

18. A method of storing application data as recited in claim 17 wherein:
- the step of replacing the selected application data occurs when the stylus is within a predetermined distance of the boundary; and
- the clipboard icon is displayed substantially at the location at which the boundary on the computer screen was impinged.

19. A method of storing application data as recited in claim 18 wherein the predetermined distance is zero.

20. A method of storing application data as recited in claim 17 wherein the step of replacing the selected application data occurs when the selected application data is within a predetermined distance of the boundary.

21. A method of storing application data as recited in claim 17 wherein the clipboard icon includes indicia suggestive of the content of the selected application data.

22. A method for moving a clipboard icon comprising the steps of:
- selecting a clipboard icon on a computer screen having a boundary, such that when the clipboard icon is selected, the clipboard icon is converted to an image of application data that has previously been stored within a clipboard memory and the image of the application data is displayed on the computer screen;
- dragging the image of the application data across the computer screen with a pointing device; and
- depositing said image, wherein when the image is deposited at a location that impinges a boundary on the computer screen, replacing the image of the selected application data with the clipboard icon and storing the selected application data in the clipboard memory associated with the clipboard icon, and wherein when the image is deposited at a location that does not impinge the boundary of the computer screen, the image of the application data is displayed on the computer screen at the deposit location and the application data is inserted in an application program file at a position that corresponds to the deposit location.

23. A method for moving a clipboard icon as recited in claim 22 wherein the entire image of the selected application data is displayed on the computer screen throughout the dragging step.

24. A method for moving a clipboard icon as recited in claim 22 wherein the computer screen is a screen of a pen-based computer system, and wherein the steps of selecting the clipboard icon and dragging the application data is accomplished with a stylus.

25. A method for moving a clipboard icon as recited in claim 24 wherein the step of replacing the selected application data occurs when the stylus is proximate the boundary.

26. A method for moving a clipboard icon as recited in claim 22 wherein the step of replacing the selected application data occurs when the selected application data is proximate the boundary.

* * * * *